United States Patent Office 2,812,259
Patented Nov. 5, 1957

2,812,259
COATED FOOD PRODUCT AND METHOD OF PRODUCING SAME

Arthur M. Mark, Chicago, Ill., assignor to Tee-Pak, Inc., a corporation of Illinois No Drawing. Application November 1, 1954, Serial No. 466,227

8 Claims. (Cl. 99—169)

This invention relates to the production of improved moisture-containing food products and more particularly to a novel method of treating such foods as fruits, vegetables and meats and meat products to increase their ability to withstand rough handling while improving the appearance and increasing the storage life of the treated food product.

One of the serious problems associated with those food industries which deal in vegetables, fruits, meats and the like, is the deleterious effect of moisture loss on the quality and appearance of such items. The problem is particularly aggravating in those situations where the vegetables, fruits, meats, and similar items have to be transported, sometimes cross-county distances and under less than optimum shipping and interim storage conditions. Besides the loss of quality and "eye appeal" resulting from moisture loss, it also represents a cost item which may be very significant. Thus, the moisture loss problem is quite serious indeed, when the food products involved are expensive items such as processed meats, sausage, hams, and the like, some of which may sell at retail for $1.00 or $2.00 per pound. With such costly items, an "in transit" moisture loss of even a few percent becomes a very important economical consideration to the manufacturer, the retailer and to the consumer as well.

To effect any commercially important improvement in the shipping and storage characteristics of such foods, and of meat products in particular, involves the solution of problems which are difficult and complex due to the number and the variety of inter-dependent factors involved. These problems include not only minimizing the evaporation of moisture from the food product but further considerations, such as maintaining insofar as possible the original appearance of the food, the use of a coating material which is in and of itself attractive, satisfactorily clear, inexpensive and compatible with the type of food treated or with any coating already on the food, cost of the treatment, ease of application, equipment and personnel requirements, and resistance to ruptures caused by rough handling of the treated food product.

My invention provides a novel treating technique which meets the foregoing requirements to an important degree and which is particularly important not only in keeping the moisture loss from the food products at a significantly low level and at low cost but at the same time maintains to an important degree the original natural appearance of the treated product and imparts to it a remarkable resistance to breakage and tearing without detracting from the appearance of the product.

The present technique involves the application of a coating composition to the food being treated by dipping, brushing, spraying or the like, followed by a curing period to "set" the coating.

Illustrative of materials which may be used as components of coating compositions for preparing treated foodstuffs according to my invention, is a tertiary polymer composition in the form of the polymerization product of vinylidene chloride, vinyl chloride and a lower alkyl acrylate, the latter three components being selected from the range of preferable proportions listed below, the total being 100 parts on the solids basis of the latex:

| | Parts |
|---|---|
| Vinylidene chloride | about 70 to 85 |
| Vinyl chloride | about 10 to 25 |
| A lower alkyl ester of acrylic acid such as methylacrylate and ethylacrylate | about 5 to 15 |

Such a polymer composition which may be prepared in accordance with the procedure described in U. S. Patent No. 2,651,626 is conveniently used for purposes of this invention in the form of an aqueous emulsion containing from about 20% to 60% solids and preferably containing about 50% solids. To such an emulsion is added a colloidal material such as silica in the form, preferably, of an aqueous dispersion, which is then mixed with the emulsion.

The resulting fluid is then applied to the food product to be protected by any convenient procedure, as by dipping, spraying or the like.

After the aforesaid emulsion of polymeric material and colloidal silica has been applied to the food product, it is allowed to drain and the coating is then cured. The curing may take place at ordinary room temperatures; however, heat may be applied thereto to speed up the curing procedure, as is well known. Processed meat products as sausage items particularly may be coated shortly after processing and while still at an elevated temperature.

Using compositions of this type, I have found it desirable that the thickness of the coating applied to the food be of the order of about 0.5 to 2.0 mils; with such a film thickness, I have found that there results good moisture loss characteristics, outstanding shelf-life, and a surprising toughness, tenacity and elasticity of the film which is sufficient to protect the treated food product by preventing rupture of the film during even severely abusive handling thereof, together with a surprisingly good resistance to fading, sliming and molding.

The techniques of my invention are particularly applicable to the treatment of food products including root crops such as carrots and turnips; citrus fruits such as oranges, lemons, and limes; fresh meats; fresh sausage such as salami and bologna; dry sausage such as cervelat, summer sausage, hard salami and the like; smoked meat items like hams, butts, Canadian bacon, liver sausage, frankfurters, ring and stick bologna; and including food products, particularly meat products such as sausage, already enclosed in a casing including the conventional regenerated cellulose sausage casings; fibrous casings (consisting of regenerated cellulose reinforced with cellulosic fibers like paper or synthetic or natural fiber); natural casings, including beef, hog, goat and sheep casings; casings made from alginates; sealed or seamed parchment casings; and hide fleshing casings, such as Cutisin, Naturin, and Brechtin.

This invention will be described in further detail in the following examples, it being understood that these are merely illustrative embodiments of particular forms of the invention and are not to be construed in a limiting sense.

EXAMPLE 1

A 75 gram quantity (13% by weight) of colloidal silica dispersion containing 15% by weight of silica (Syton C-15) was added to 500 grams of an aqueous emulsion containing 51% (solids basis) of a ternary polymer composition comprising the polymerization product of a mixture of 78 parts of vinylidene chloride, 16 parts of vinyl chloride and 6 parts of methylacrylate.

A control sample was prepared by stirring 75 grams of water into 500 grams of an identical aqueous emulsion.

The two mixtures were coated on separate but similar pieces of regenerated cellulose film, the films air dried, soaked in water, and then stripped from the regenerated cellulose film.

The films were then cut into ¼ inch strips for Scott tests and the results summarized as follows, and as shown in Table 1 below:

Table 1

| Sample | Average Elongation, percent |
|---|---|
| A. Control | 309 |
| B. Films Containing Silica | 441 |

| Sample | Average Tenacity, Gm./sq. mil |
|---|---|
| A. Control | 0.62 |
| B. Films Containing Silica | 1.15 |

EXAMPLE 2

A 150 gram quantity of colloidal silica dispersion (Syton C-15) containing 15% by weight of silica was stirred into 100 grams of a latex in the form of an aqueous emulsion containing 51% (solids basis) of a ternary polymer composition comprising the polymerization product of a mixture of 78 parts of vinylidene chloride, 16 parts of vinyl chloride and 6 parts of methylacrylate. The resulting homogeneous latex contained 1.95% by weight of silica.

One pound chub (Praski) sausages encased in regenerated cellulose casings, were dipped into the latex, allowed to drain, and were suspended in air for curing (drying) at ambient temperatures. The coating was found to have set or cured in about one hour. The resulting coating was tough, resilient, flexible.

EXAMPLE 3

Chub sausages like those used in Example 2 were dipped and air dried in the manner described in Example 2, but were then additionally cured by dipping them in water at a temperature at 195° F. and then allowing them to dry again in air at ambient temperatures. These sausages like those in Example 2 were found to have exceptionally good resistance to flexing, were tough and resilient.

EXAMPLE 4

Controls for Examples 2 and 3 were run using 1000 grams of the latex to which was added 150 grams of water.

The coatings which had been prepared so that they contained silica (Examples 2 and 3) were found to be slightly less transparent than the controls but not objectionably so; and in sharp contrast to the controls the silica-containing casings were found to be much more rugged and tough than the controls.

In brief, the coating composition which is used in preparing the novel food products of this invention contains as essential components, (a) a latex such as is formed by the aqueous emulsion polymerization of polymers and (b) a colloidal stable oxide or mixture of oxides of such materials as aluminum, titanium, zirconium, beryllium, magnesium, iron and the like.

From 0.01% to 10.0% of colloidal oxides material may be used (based on the solids of the emulsion containing the polymers) though I prefer to use approximately 0.1% to 5.0%. Amounts higher than about 10%, and even as high as 50% may be used in some circumstances although there is generally a decrease in strength and tenacity after it is applied to the food product and cured when such high amounts of colloidal material are used.

Although the preferred coating composition used in the practice of my invention contains the hereinbefore described ternary latex, it is to be understood that other latices may be substituted therefore or mixed therewith providing the resulting film has substantially the same order of moisture transmission. Among such latices may be mentioned those which are obtained by the aqueous emulsion polymerization of butadiene with acrylonitrile or styrene, ternary polymers of butadiene, styrene and acrylonitrile, copolymers of butadiene and coumarone or indene and the like. Other particularly suitable polymeric materials are in the form of latices prepared by the aqueous emulsion polymerization of, for example, vinylidene chloride and acrylonitrile; vinyl chloride and butadiene; and vinyl chloride and polyvinyl butyral. In the preparation of such latices, as is well known in the art, emulsifying agents and plasticizing agents of one kind or another may be employed. Typical of such plasticizers are Santicizer 141 (2-ethyl hexyl diphenyl phosphate); dioctyl phthalate; glycerine; propylene glycol and the like.

My invention is particularly useful in the treatment of such heavy and limp products as hams, long thuringers, ring bologna, bone-out hams, Canadian bacon and similar shaped products which are flexed, bent and twisted in handling even during normal shipping procedures. With ordinary coatings such treatment invariably results in a rupture of the film, with its concomitant moisture loss, loss of bloom, and the other damaging changes heretofore described.

The practice of my invention imparts to food products and particularly to those which are most apt to be abused in transit because of their configuration like the thuringer above described, the properties of low moisture loss, combined with resistance to deterioration of color and appearance, thinness and clearity of coating, the ability to be rapidly treated, together with outstanding resiliency and toughness of the coating material which impart resistance to abrasion and tearing of the treated product in transit.

I claim:

1. A moisture-containing food product encased in a coating comprising a ternary polymer composition of vinylidene chloride, vinyl chloride and a lower alkyl acrylate selected from the range of proportions including vinylidene chloride, 70 to 85 parts, vinyl chloride, 10 to 25 parts, and a lower alkyl ester of acrylic acid, 5 to 15 parts, in admixture with up to about 50 parts based on the ternary polymer composition of a colloidal metal oxide.

2. A meat product encased in a casing over which has been applied a coating composition comprising the polymerized reaction product of a ternary polymer composition of vinylidene chloride, 70 to 85 parts, vinyl chloride, 10 to 25 parts and a lower alkyl acrylate, 5 to 15 parts in admixture with 0.01 to 5.0% based on the ternary polymer composition, of a colloidal metal oxide.

3. The product of claim 2 wherein the outer coating has a thickness of from about 0.5 to about 2.0 mils.

4. The product of claim 2 wherein the said casing is selected from the group consisting of regenerated cellulose; regenerated cellulose reinforced with a member of the group selected from cellulosic fibers and other synthetic and natural fibers; natural casings; alginate casings; parchment casings; and hide fleshing casings.

5. A package comprising a sausage encased in a regenerated cellulose casing, and having a substantially uniform, continuous outer coating comprising a polymerized ternary composition comprising vinylidene chloride 70 to 85 parts, vinyl chloride 10 to 25 parts, and a lower alkyl ester of acrylic acid 5 to 15 parts, in admixture with 0.01 to 5.0% based on the ternary polymer composition colloidal silica.

6. A method of producing a packaged food product which comprises placing the food product in a casing, contacting the encased food product with an aqueous emulsion comprising the polymerization product of vinylidene chloride, 70 to 85 parts, vinyl chloride, 10 to 25 parts, and a lower alkyl ester of acrylic acid, 5 to 15 parts, said emulsion containing from about 20 to 60% solids, and to which has been added an aqueous emulsion containing a metal oxide in colloidal form, and then curing the resulting outer coating.

7. The method of claim 6 wherein the said ester is the methyl ester.

8. The method of claim 6 wherein the oxide is silica.

References Cited in the file of this patent

UNITED STATES PATENTS

| | | |
|---|---|---|
| 2,337,645 | Cadwell | Dec. 28, 1943 |
| 2,467,340 | Seymour | Apr. 12, 1949 |
| 2,467,341 | Seymour | Apr. 12, 1949 |
| 2,563,079 | Smith | Aug. 7, 1951 |
| 2,611,708 | Owens et al. | Sept. 23, 1952 |
| 2,651,626 | De Nie | Sept. 8, 1953 |